US011304360B2

(12) United States Patent
Stöcklin

(10) Patent No.: US 11,304,360 B2
(45) Date of Patent: Apr. 19, 2022

(54) AGRICULTURAL MACHINE FOR DISPENSING MATERIAL TO BE DISTRIBUTED AND METERING ELEMENT FOR SAID AGRICULTURAL MACHINE

(71) Applicant: RAUCH LANDMASCHINENFABRIK GMBH, Sinzheim (DE)

(72) Inventor: Volker Stöcklin, Ringsheim (DE)

(73) Assignee: RAUCH LANDMASCHINENFABRIK GMBH, Sinzheim (DE)

( * ) Notice: Subject to any disclaimer, the term of this patent is extended or adjusted under 35 U.S.C. 154(b) by 311 days.

(21) Appl. No.: 16/615,932

(22) PCT Filed: May 8, 2018

(86) PCT No.: PCT/EP2018/000244
§ 371 (c)(1),
(2) Date: Nov. 22, 2019

(87) PCT Pub. No.: WO2018/219489
PCT Pub. Date: Dec. 6, 2018

(65) Prior Publication Data
US 2020/0229342 A1 Jul. 23, 2020

(30) Foreign Application Priority Data

May 29, 2017 (DE) ..................... 10 2017 005 094.5

(51) Int. Cl.
*A01C 7/08* (2006.01)
*A01C 7/10* (2006.01)
(Continued)

(52) U.S. Cl.
CPC .............. *A01C 7/088* (2013.01); *A01C 7/081* (2013.01); *A01C 7/085* (2013.01); *A01C 7/102* (2013.01);
(Continued)

(58) Field of Classification Search
CPC ......... A10C 7/081; A10C 7/085; A10C 7/088; A10C 7/102; A10C 7/12; A10C 7/126; A10C 15/04; A10C 19/02
See application file for complete search history.

(56) References Cited

U.S. PATENT DOCUMENTS 8,196,534 B2   6/2012 Meyer et al.
9,144,190 B2   9/2015 Henry et al.
(Continued)

FOREIGN PATENT DOCUMENTS

AT       258629 B    12/1967
AT        14771 U1    5/2016
(Continued)

OTHER PUBLICATIONS

International Search Report with English translation corresponding the International Application No. PCT/EP2018/000244, dated Aug. 7, 2018 (6pages).
(Continued)

*Primary Examiner* — Thomas B Will
*Assistant Examiner* — Ian A Normile
(74) *Attorney, Agent, or Firm* — Flynn Thiel, P.C.

(57) ABSTRACT

An agricultural machine for dispensing material to be distributed, which agricultural machine comprises at least one metering element having a metering roller for metering the material to be distributed mounted in a metering housing and is rotatably driven. The metering roller has a plurality of metering wheel segments, each metering wheel segment of the metering roller is assigned a separate drive to drive the
(Continued)

metering wheel segments independently of each other to ensure exact metering of the material to be distributed within finely subdivided partial widths of the agricultural machine. The drives of the metering wheel segments of the metering roller are arranged in the interior thereof, for example within a tubular hollow body, on which the metering wheel segments are mounted, such that the drives are ideally accommodated with protection from external influences and in a space-saving manner.

24 Claims, 6 Drawing Sheets

(51) Int. Cl.
*A01C 19/02* (2006.01)
*A01C 15/04* (2006.01)
*A01C 7/12* (2006.01)

(52) U.S. Cl.
CPC .............. *A01C 7/126* (2013.01); *A01C 15/04* (2013.01); *A01C 19/02* (2013.01)

(56) References Cited

U.S. PATENT DOCUMENTS

| | | |
|---|---|---|
| 2014/0367413 A1 | 12/2014 | Walter |
| 2017/0055435 A1 | 3/2017 | Henry et al. |
| 2017/0196162 A1* | 7/2017 | Sheppard ............... A01C 19/02 |

FOREIGN PATENT DOCUMENTS

| | | | |
|---|---|---|---|
| DE | 3616538 A1 | 11/1987 | |
| DE | 102004030240 A1 | 2/2005 | |
| DE | 202005002495 U1 | 6/2005 | |
| EP | 0927511 A2 | 7/1999 | |
| EP | 1357219 A2 | 10/2003 | |
| EP | 2329703 B2 | 6/2011 | |
| EP | 2786649 A2 | 8/2014 | |
| KR | 20040034050 * | 4/2004 | ............... A01C 7/04 |
| WO | 2015120982 A1 | 8/2015 | |

OTHER PUBLICATIONS

Written Opinion of International Searching Authority corresponding to International Application No. PCT/EP2018/000244, dated Aug. 7, 2018 (6 pages).

German Search Report corresponding to German Application No. 10 2017 005 094.5, dated Mar. 28, 2018 (6 pages).

Office Action to German Patent Office corresponding to International Application No. PCT/EP2018/000244, dated Apr. 12, 2019 (6 pages).

* cited by examiner

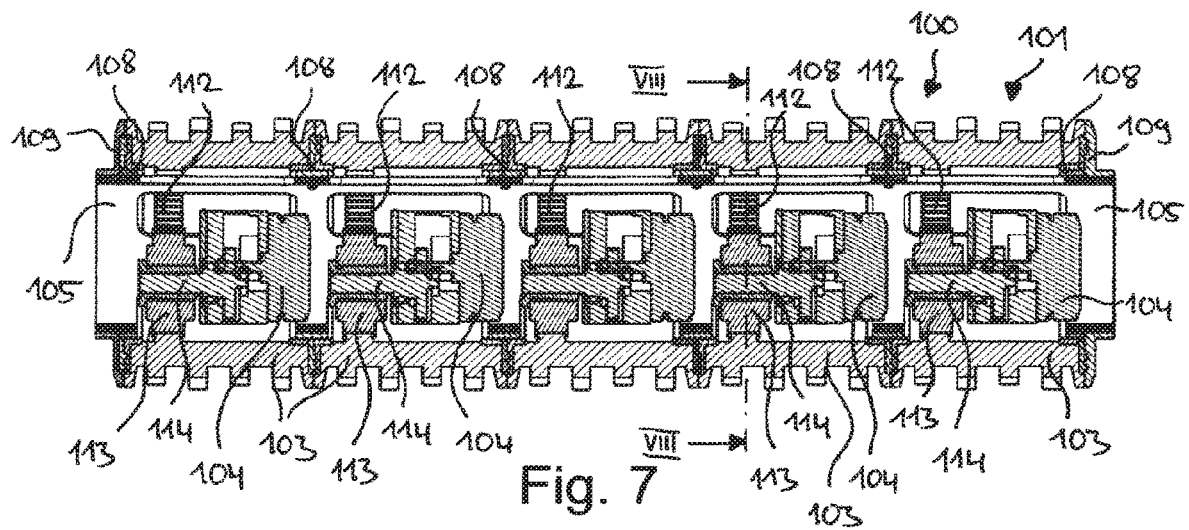
Fig. 7
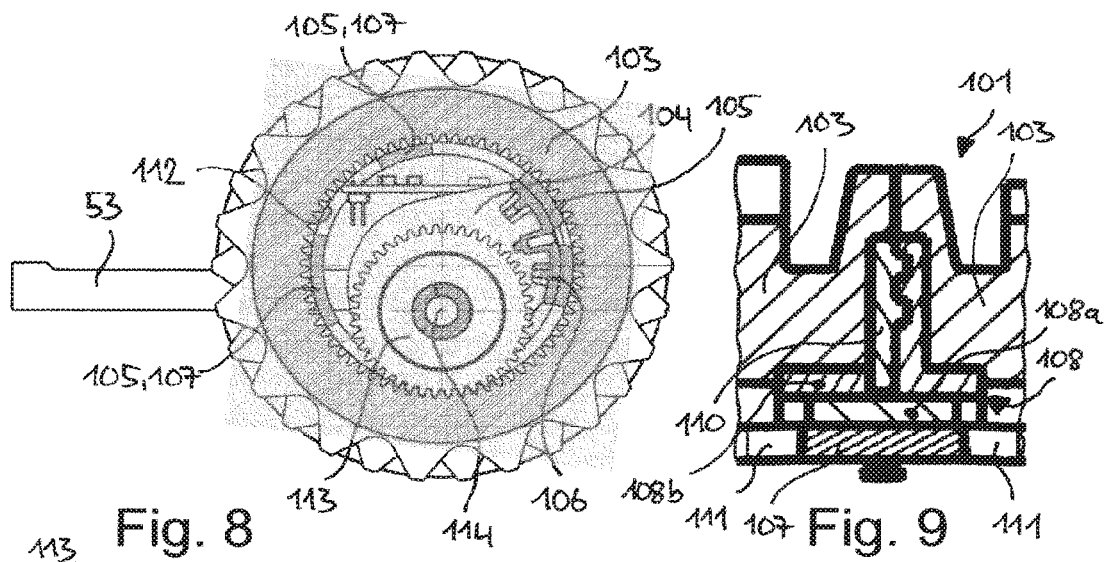
Fig. 8
Fig. 9
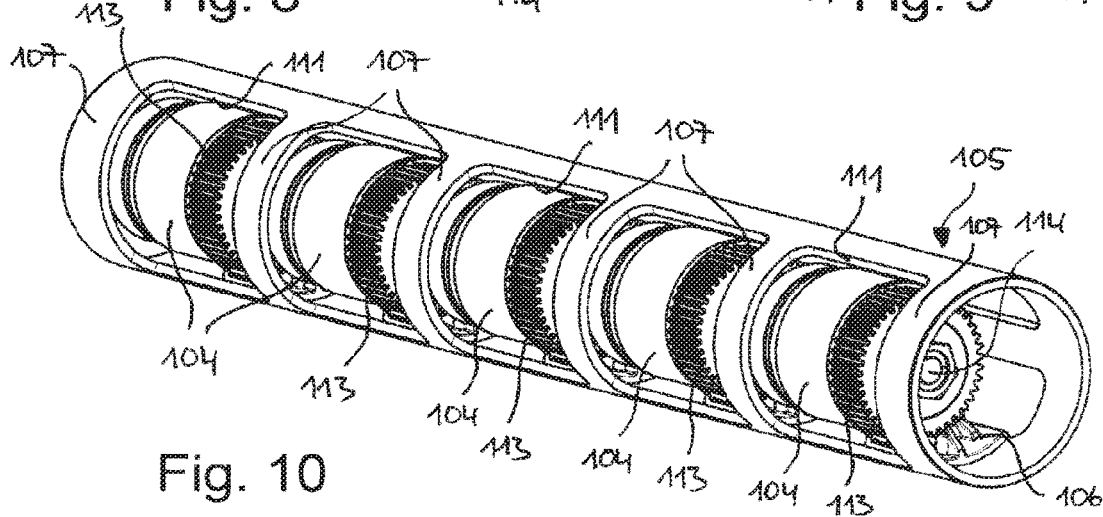
Fig. 10

AGRICULTURAL MACHINE FOR DISPENSING MATERIAL TO BE DISTRIBUTED AND METERING ELEMENT FOR SAID AGRICULTURAL MACHINE

The present invention relates to an agricultural machine for dispensing material to be distributed, in particular fertilizer and/or seed, which agricultural machine comprises at least one metering element having a metering roller for metering the material to be distributed, which metering roller is mounted in a metering housing and is rotatably driven, wherein the metering roller of the metering element has a plurality of metering wheel segments and each metering wheel segment of the metering roller is assigned a separate drive in order to drive the metering wheel segments independently of each other. The invention further relates to a metering element of the aforementioned type which is suitable, in particular, for such an agricultural machine for dispensing material to be distributed.

Agricultural machines, the metering elements thereof comprising rotatably driven metering rollers, are known, in particular, in many different embodiments, in particular in the form of fertilizer spreaders and/or seeders for dispensing powdery and/or particulate material to be distributed, such as fertilizer, seed and the like, and generally comprise a storage container for receiving the material to be distributed, the metering element(s) being arranged therebelow. Whilst metering slides which are actuated by an actuator or manually and which cooperate with an outlet opening of the storage container are frequently also used as metering elements, the metering element in the agricultural machines under discussion here has a rotatably driven metering roller which, in particular, may be designed in the form of a cellular wheel roller and/or cam wheel roller. The metering roller is mounted in a metering housing which generally has an inlet which is arranged on its upper face and which is connected, for example, to the storage container, and an outlet which is arranged on its lower face. Such a metering element is disclosed, for example, in EP 2 786 649 A2.

Agricultural machines which make use of metering elements comprising metering rollers may be fainted in the simplest case, for example, from so-called box, spreaders and/or box seeders in which the material to be distributed, which is stored in a storage container and which is dispensed by means of the metering roller of the metering element, is dispensed onto the surface of the soil purely due to gravitational force via one or more deposit openings which are provided, for example, at the end of pipes extending over the soil or is introduced into the soil, for example, by means of suitable injection devices, seeding tines, seed coulters, and the like. Such box spreaders and/or box seeders, which are generally designed as trailers or attachments for traction machines such as tractors, primarily serve for dispensing the material to be distributed along relatively narrow surfaces, such as for example in the case of the cultivation of vegetables for distributing fertilizer on relatively narrow plots. The working width thereof which substantially corresponds to the spreading width is often in the order of, for example, approximately 80 cm up to approximately 3 m. If the material to be distributed is intended to be dispensed on just one partial width, as for example may be required when dispensing the material to be distributed on the edge of a field or plot, the axial portions of the metering roller which are not required and which may be designed according to the material to be distributed which is to be dispensed, for example as a cellular wheel roller or cam wheel roller, and advantageously may be either entirely replaceable or may be made up of individual interchangeable cellular wheel segments or cam wheel segments (see for example 2 786 649 B1 cited above), may be provided with dummy rings covering the cellular wheel chambers and/or the cam troughs, but in terms of handling technology these rings may prove to be costly and awkward.

Moreover, metering elements having a metering roller which is mounted in a metering housing and which is rotatably driven are used, in particular, in pneumatic distribution machines which at the same time may be designed as pneumatic fertilizer spreaders and/or pneumatic seeders. Pneumatic distribution machines may be produced, on the one hand, in a lightweight design as attachments which may be coupled to the three-point hitch of a traction machine, such as a tractor, and, on the other hand, in a heavy-duty design, being able to be positioned onto an axle-supported trailer or a self-propelled vehicle. Said pneumatic distribution machines generally comprise a plurality of booms which protrude outwardly to the side and which receive conveying lines terminating at a variable spacing from one another. A fan serves for conveying the material to be distributed, the pressure line thereof adjoining an outlet of the metering housing of one respective metering element and feeding into a pressure distributor to which the conveying lines are adjoined. Transfer chambers which are arranged between the pressure distributor and the conveying lines and which expediently may be provided with one respective nozzle and injectors comprising a diffusor, serve for transferring the spreading material from the metering roller of the metering element to the conveying lines in order to ensure that the same quantity of material to be distributed is discharged to each conveying line. The material to be distributed is finally conveyed pneumatically via the outwardly deflected conveying lines to the end thereof, where the spreading material is transferred to corresponding distribution elements.

Depending on the embodiment of the agricultural machine for dispensing material to be distributed and/or depending on the type of material to be distributed which is to be dispensed, in the simplest case the distribution elements may comprise deposit openings, for example, the material to be distributed being dispensed therefrom due to gravitational force in a more or less linear manner on the surface of the soil, such as may be desired for example for applying fertilizer in rows. The deposit openings in this case may be provided, for example, immediately below the metering element or even at the end of pipelines which extend downstream of the metering element directly above the soil so that the material to be distributed is not subjected to any effects of the wind when it drops onto the soil. Moreover, in particular in the case of pneumatic distribution machines of the type mentioned above, deflector plates and/or deflector disks may be provided as distribution elements, the material to be distributed which is pneumatically transported in one respective conveying line striking against said deflector plates and/or deflector disks and being substantially deposited from there onto the soil in a fan shape. Other types of distribution elements as are used, in particular, for distributing seed but also for deep root fertilization comprise injection devices for introducing the material to be distributed into the soil as are disclosed in WO 2015/120982 A1, for example, in order to introduce the material to be distributed into a furrow and to reclose the furrow, preferably by means of slit closing devices arranged downstream, such as so-called combs or the like. Moreover, seed coulters or seeding tines are also common as distribution elements which likewise create a slit in the soil into which the material to be distributed may be deposited.

Such a pneumatic distribution machine in the form of a pneumatic fertilizer distributor is disclosed, for example, in DE 10 2004 030 240 A1 and expressly forms the subject-matter of the present disclosure. The disclosed pneumatic distribution machine in this case has a plurality of metering elements which in each case comprise a rotatably driven metering roller, a plurality of transfer chambers being in turn adjoined to the metering housing thereof on the outlet side, said transfer chambers being subjected to pressure by means of fans, a plurality of conveying lines in groups leading from said transfer chambers and said conveying lines feeding into one respective distribution element. A partial width switching is ensured by a separate motor being assigned to each metering element for driving its respective metering roller, said motors being controlled independently of one another in terms of rotational speed, so that distribution elements, which are arranged adjacent to one another and which are supplied with material to be distributed by the respective groups of conveying lines which extend from one respective metering element, may be connected up and/or disconnected in groups. Moreover, by successively switching on and/or switching off the metering elements such that initially the metering elements connected to the outer distribution elements are switched on and only then are the metering elements which are located further inwardly switched on and/or initially the metering elements connected to the inner distribution elements are switched off and only then are the metering elements which are located further outwardly switched off, it is possible to compensate for the different transport times required by the conveying lines of different lengths for the pneumatic transport of the material to be distributed, so that the distribution process may be uniformly commenced at the start of the field and/or uniformly finished at the end of the field. Moreover, by driving the metering rollers of the metering elements at different rotational speeds it is also possible to take into account different regions of the field which have a different requirement for the supply of material to be distributed within the entire working width or, on the other hand, when cornering to compensate for oversupplies resulting on the inside of the corner and/or for undersupplies resulting on the outside of the corner.

However, in this manner only a relatively approximate partial width switching may be implemented, since the metering elements which are rotatably driven independently of one another in each case communicate with groups of distribution elements but the assignment of a separate metering element to one respective distribution element would not be possible in practice due to space reasons, let alone in terms of economy. In order to be able to switch off individual distribution elements within a partial width, such as may be required, for example, relative to the outer distribution elements when dispensing material to be distributed in the region of the field edge, even with pneumatic distribution machines generally there remains no other option but to provide the axial portions of the metering roller which are connected via one respective transfer chamber to the distribution elements, which are not required, with dummy rings covering the cellular wheel chambers and/or the cam troughs, said metering roller, for example, in turn being able to be designed as a cellular wheel roller or cam roller according to the material to be distributed which is to be dispensed, and advantageously either being entirely replaceable or being able to be made up of individual cellular wheel segments or cam wheel segments which are interchangeable (see for example 2 786 649 B1 cited above).

EP 2 329 703 B2 discloses a metering element which is provided, in particular, for agricultural seeders and which has a metering roller with a plurality of metering wheel segments. For driving the metering wheel segments independently of one another in a rotational manner, the metering wheel segments are provided on their radial internal circumference with a coupling mechanism, for example in the form of a multi-edged profile, which optionally may be coupled to and/or uncoupled from a central drive shaft of the metering wheel segments. In this manner, whilst individual metering wheel segments which are not required may be brought to a standstill, it is not possible to provide a rotary drive of different metering wheel segments at different rotational speeds, as might be desired, for example, when cornering or when traveling over soil surfaces having a different requirement for the material to be distributed. The same applies substantially to the metering element of a seeder disclosed in EP 0 927 511 A1 which has a metering roller with a plurality of different metering wheel segments which for the purpose of connecting up and/or disconnecting the rotary drive thereof may be coupled to and/or uncoupled from a central drive shaft independently of one another by means of coupling elements.

Finally, a seeder having a metering element which is formed once again by a metering roller may be derived from AT 14 771 U1, said metering element comprising two coaxial metering wheel segments, wherein the two metering wheel segments in each case comprise a plurality of cellular wheels with solid disks arranged therebetween and in each case have a separate drive in the form of two electric motors which may be regulated separately from one another. The force coupling between one respective electric motor and one respective metering wheel segment in this case is implemented, on the one hand, by a hollow shaft which connects the one motor to the one metering wheel segment which is located fixedly in terms of rotation on the hollow shaft and, on the other hand, by a core shaft which is arranged coaxially to the hollow shaft and which connects the other motor to the other metering wheel segment which is located fixedly in terms of rotation on the core shaft. In this manner, whilst a separate drive of both metering wheel segments is possible at practically any rotational speed, the drive proves costly in terms of construction and requires a large amount of constructional space which in generic distribution machines is generally only available to a limited extent, wherein in particular a separate drive is possible for a maximum of two metering wheel segments, so that only a very approximate partial width switching of two partial widths may be achieved.

The object of the invention is to develop an agricultural machine for dispensing material to be distributed of the type mentioned in the introduction as well as a metering element which is suitable, in particular, for such an agricultural machine and which has a rotatably driven metering roller mounted in a metering housing, substantially avoiding the aforementioned drawbacks, such that a metering which is more accurate relative to the prior art is possible and, in particular, an individual metering of the material to be distributed is possible within small partial widths of the agricultural machine.

According to the invention, this object is achieved in an agricultural machine and in a metering element of the type mentioned in the introduction by the drives of the metering wheel segments of the metering roller being arranged in the interior thereof.

The embodiment according to the invention of the metering roller of the metering element permits, with an extremely compact construction, an individual metering of the material to be distributed along the individual axial portions of the metering roller formed by one respective metering wheel segment, by the metering wheel segments being driven rotatably by means of their respective drive independently of one another. As a result, individual metering wheel segments may be switched off so that no metering is carried out at that point, whilst other metering wheel segments may be driven rotatably at the rotational speed corresponding to the desired mass flow of material to be distributed, in order to dispense the material to be distributed only where it is desired.

Moreover, due to the individual drives assigned to the metering wheel segments of the metering roller, it is possible that the individual metering wheel segments are not only driven at the desired rotational speed or are able to be brought to a standstill but, in particular, are also able to be driven at practically any different rotational speeds in order to supply each partial width corresponding to one respective metering wheel segment of the metering roller with the individually desired mass flow of material to be distributed. In this manner, in each case the required quantities to be distributed may be accurately metered within finely subdivided partial widths over the working width of the agricultural machine so that, in particular, a distribution of the material to be distributed is possible with a very high degree of accuracy depending on the respective position of the agricultural machine on the field according to predetermined application cards. The detection of the position of the agricultural machine in this case may be carried out by means of known, generally satellite-assisted, position detection systems, such as GPS or the like, which by now form part of the prior art in modern agricultural distribution machines. Additionally, by decelerating and/or accelerating individual metering wheel segments of the metering roller during cornering of the agricultural machine, such that distribution elements assigned to one respective metering wheel segment and arranged at different lateral spacings relative to the direction of travel of the agricultural machine are supplied on the inside of the corner with mass flows of material to be distributed which reduce from the inside to the outside and are supplied on the outside of the corner with mass flows of material to be distributed which increase from the inside from the outside, it is naturally possible to compensate for oversupplies of the soil with material to be distributed which are otherwise produced on the inside of the corner during cornering and/or undersupplies of the soil with material to be distributed on the outside of the corner, as is disclosed as such in DE 10 2004 030 240 A1 which is mentioned in the introduction for groups of distribution elements assigned to the metering roller of one respective metering element. Additionally, by successively connecting up and/or disconnecting the individual metering wheel segments such that distribution elements assigned to one respective metering wheel segment and arranged at different lateral spacings relative to the direction of travel of the agricultural machine are switched on from outside to inside and/or switched off from inside to outside, it is naturally possible to compensate for different lengths of the conveying lines supplying the distribution elements with material to be distributed, as is also disclosed as such in DE 10 2004 030 240 A1 which is mentioned in the introduction for groups of distribution elements assigned to the metering roller of one respective metering element.

This results in a very fine subdivision of potential partial widths, wherein each metering wheel segment is able to supply a partial width of the entire working width of the agricultural machine. The metering element according to the invention in this case, in particular, is suitable for all known agricultural machines which serve for dispensing powdery or particulate materials to be distributed, such as in particular fertilizer and/or seed, whether formed, for example, from so-called box spreaders or box seeders of relatively simple construction in which the material to be distributed drops onto the soil downstream of the individual metering wheel segments of the metering roller or, for example, whether formed from pneumatic distribution machines which are more complex relative thereto and in which the material to be distributed may be transferred downstream of the individual metering wheel segments of the metering roller to different types of distribution elements which are arranged at different lateral spacings relative to the direction of travel.

In this case, according to the invention the drives of the metering wheel segments of the metering roller are arranged in the interior of the metering wheel segments. In this manner, on the one hand, an exceptionally compact overall structure of the metering element is produced by the available internal volume of the metering roller being optimally utilized and, on the other hand, the drive(s) is or are ideally accommodated with protection from external influences inside the outer surfaces of the metering wheel segments of the metering roller, which consequently form a type of "protective housing".

Depending on the material to be distributed which is to be dispensed, such as different seeds, including fine seed and/or different fertilizers, the metering wheel segments of the metering roller may also expediently be formed by cam wheel segments and/or cellular wheel segments, wherein naturally metering wheel segments having any known metering structures of any type may also be used, such as for example those in the manner of cellular wheel segment rollers, perforated rollers, grooved rollers, or the like. Moreover, naturally different types of metering wheel segments may be combined together in order to be able to dispense different quantities and/or types of material to be distributed using one and the same metering roller.

The drives of the metering wheel segments of the metering roller may preferably comprise electric motors or hydraulic motors, wherein the motorized drive of the metering wheel segments in both cases may comprise, in particular, gear motors. In the case of electric motors, for example, advantageously servo-motors are suitable.

The embodiment according to the invention of the metering wheel segments of the metering roller, which are rotatably driven independently of one another by means of drives arranged in the interior thereof, in this case provides the possibility, in particular, that the metering roller of the metering element has not just two, but at least three, preferably more than three, metering wheel segments driven independently of one another, which in each case are preferably all rotatably driven independently of one another by means of a separate drive.

In terms of construction, in an advantageous embodiment the metering wheel segments of the metering roller may be mounted on a hollow body which extends coaxially to the rotational axis thereof and which expediently may be arranged in a stationary manner in the metering housing. Both rolling bearings or plain bearings may be considered as bearings for the metering wheel segments, wherein plain bearings may prove advantageous in terms of very small constructional space. The hollow body serving as a bearing body for the metering wheel segments of the metering roller is expediently designed to be substantially tubular and has a circular cylindrical outer surface which extends at least around part of its outer circumference. The hollow body in this case may have a substantially C-shaped and/or U-shaped cross section and/or have a circular cross section, wherein with regard to a high degree of dimensional stability it may be advantageous if it has a circular cross section over the entire circumference at least on its axial portions on which the metering wheel segments are mounted.

In this case, the drives of the metering wheel segments may preferably be fixed in the interior of the hollow body bearing the metering wheel segments, such as for example on bearing flanges provided on the inner face of the hollow body, the drives expediently being able to be releasably fastened thereto.

For the transmission of the rotational movement produced by means of the drives to the individual metering wheel segments, the drives for example in each case may have a gearwheel which is assigned to one respective metering wheel segment, whilst the hollow body has a through-opening at least on its axial portion assigned to one respective gearwheel, wherein one respective gearwheel is in engagement with one respective internal toothing of one respective metering wheel segment. In order to assign a separate drive to each metering wheel segment and in this manner to ensure rotational driving of all metering wheel segments at different rotational speeds independently of one another, for example, a gearwheel on the output side of each drive is permanently in engagement with the internal toothing of one respective metering wheel segment, wherein the shaft bearing the gearwheel may be expediently arranged eccentrically relative to the center axis of the, in particular, approximately circular cylindrical hollow body, the outer surface thereof in turn in the region of the gearwheel having a through-opening and/or only extending around part of the entire circumference, which as a result may be designed at least partially to be approximately C-shaped or U-shaped.

The metering wheel segments of the metering roller may preferably be sealed relative to one another on their front faces which face one another by means of slip-ring seals, in particular in the form of labyrinth seals, in order to prevent a penetration of material to be distributed into the intermediate spaces between the metering wheel segments and, in particular, also to protect functional parts received in the interior of the hollow body, such as in particular the drive(s) of the metering wheel segments or parts thereof, from penetrating dirt and moisture.

In order to be able to adapt the metering wheel segments of the metering roller to different types of material to be distributed, the metering wheel segments advantageously may be replaceably mounted on the hollow body, wherein the metering wheel segments, in particular,
- may be pushed onto the hollow body in the axial direction; and/or
- are of multi-part configuration in the form of substantially circular arc-shaped metering wheel segment portions which may be releasably fastened to one another.

In the first-mentioned case, for example, the metering wheel segments may be pushed onto the outer bearing shells of the plain or rolling bearings serving for the mounting thereof on the hollow body, wherein the hollow body preferably in the region of at least one of its ends may be provided with a—releasable or stationary—peripheral projection serving as a stop for a terminal metering wheel segment, whilst its opposing end, for example, may be provided with a releasable retaining ring serving as a stop for the opposing terminal metering wheel segment, in order to fasten the metering wheel segments releasably to the hollow body so that said metering wheel segments are axially fixed in a manner which is secure and reliable but also rotatable. Alternatively, naturally two releasable retaining rings which serve as terminal axial abutments for the metering wheel segments may also be provided. In the last-mentioned case, optionally corresponding circumferential projections and/or retaining rings of the hollow body may be provided, wherein the individual metering wheel segments, however, may be formed from a plurality, in particular from two, metering wheel segment portions with an approximately circular arc-shaped cross section and which expediently extend in each case over a periphery of approximately 180° and on their front faces which face one another in each case are releasably fastenable to one another. The metering wheel segment portions may, as a result, be positioned from opposing sides onto one respective outer bearing shell of the bearing provided on the outer surface of the hollow body and then fastened to one another on the front face, for example screwed together in order to fix said metering wheel segment portions releasably to the respective bearing shell.

In addition to their arrangement in the interior of the metering wheel segments, such as in particular in the interior of the hollow body bearing said metering wheel segments, the drives of the metering wheel segments of the metering roller may be accommodated in a housing in order to provide an encapsulation of at least the drive motor. Moreover, for protecting the drives it may be provided that the drive(s) is and/or are flooded with an inert liquid, in particular oil, such as for example transformer oil or the like.

With regard to an accurate activation of the individual metering wheel segments of the metering roller, preferably a position detection sensor, in particular in the form of a rotational speed sensor, may be assigned to each metering wheel segment, said sensor being expediently connected to a control and/or regulating device of the agricultural machine, which controls and/or regulates the individual metering wheel segments of the metering roller(s) according to the respectively required mass flow of material to be distributed. Such a rotational speed sensor may be provided, for example, on one respective metering wheel segment and/or on the hollow body bearing this metering wheel segment, on a gearwheel in engagement with the metering wheel segments of the metering roller and/or on a shaft bearing this gearwheel or a shaft of the drive motor or the gear thereof.

Moreover, it may be provided for the purposes of control and/or regulating technology that a separate control module is assigned to
- one respective drive of one respective metering wheel segment and/or
- groups of drives of a plurality of metering wheel segments, said control module in particular being connected to a control and/or regulating device of the distribution machine.

In terms of construction, advantageously it may also be provided that a plurality of guide plates is assigned to the metering wheel segments of the metering roller, said guide plates being arranged spaced apart from one another corresponding to the axial length of one respective metering wheel segment and in each case extending between two adjacent metering wheel segments directly onto the outer surface of the metering roller. The guide plates which are arranged, in particular, on the outer surface portion on the outlet side of the metering wheel segments serve for preventing a mixing of the mass flows of material to be distributed which are metered by the respectively adjacent metering wheel segments and which are potentially different, so that in particular it is possible in a simple manner to supply with a high degree of accuracy, for example pneumatically, the mass flow of material to be distributed which is metered by each metering wheel segment to a separate distribution element.

According to a development, it may be further provided that the metering element comprises two rotatably driven metering rollers which are mounted in one or in one respective metering housing for metering different materials to be distributed, wherein the metering rollers of the metering element in each case have a plurality of metering wheel segments which, in particular, correspond to one another and which are rotatably driven independently of one another, wherein the materials to be distributed which are metered by one respective metering wheel segment of both metering rollers in each case may be dispensed together. As a result, different materials to be distributed, for example specific seeds with a specific fertilizer added thereto, may be metered together, wherein the one material to be distributed may be metered by means of the metering wheel segments of the one metering roller and the other material to be metered may be metered by means of the—optionally different type of—metering wheel segments of the other metering roller, after which the respective mass flows of the first and second material to be distributed which have been metered by means of metering wheel segments which correspond to one another, on the one hand, of the one metering roller and, on the other hand, of the other metering roller, in each case may be combined and dispensed together, by for example being transferred to one respective distribution element or even directly deposited on the soil purely due to gravitational force.

As already indicated, practically any known distribution elements may preferably be assigned to the metering wheel segments of the metering roller, wherein preferably a distribution element, in particular from the group including:

deposit openings for depositing the material to be distributed on the surface of the soil;

deflector plates for the transverse distribution of the material to be distributed over a partial width of the entire working width;

injection devices for introducing the material to be distributed into the soil; and seed coulters or seeding tines is assigned to one respective metering wheel segment of the metering roller.

As already mentioned above, the metering element according to the invention is suitable, in particular—if not exclusively—for agricultural machines in the form of pneumatic distribution machines which have a plurality of transfer chambers which are arranged downstream of one respective metering wheel segment of the metering roller of the metering element and which, on the one hand, are connected to at least one fan and which, on the other hand, feed into one respective conveying line in order to transfer the material to be distributed, which is metered by one respective metering wheel segment of the metering roller, pneumatically to distribution elements which are arranged at a variable lateral spacing from the longitudinal axis of the distribution machine. Such distribution machines may primarily be designed as pneumatic spreaders, as is disclosed as such, for example in DE 10 2004 030 240 A1 cited in the introduction, and/or as pneumatic seeders and/or seed drills.

Such a pneumatic distribution machine may, in particular, also comprise a plurality of metering elements according to the invention with one respective rotatably driven metering roller which is mounted in one respective metering housing and a plurality of transfer chambers which are arranged downstream of one respective metering element and which, on the one hand, are connected to at least one fan and which, on the other hand, feed into one respective conveying line in order to transfer the material to be distributed, which is metered by the metering roller of one respective metering element, pneumatically to distribution elements, wherein the metering roller of one respective metering element has a number of metering wheel segments which corresponds to the number of transfer chambers, said metering wheel segments being rotatably driven independently of one another.

Further features and advantages of the invention are disclosed from the following description of an exemplary embodiment with reference to the drawings, in which:

FIG. 7 shows a schematic longitudinal section through the metering roller of the metering element according to FIG. 6;

FIG. 8 shows a schematic cross-sectional view of the metering roller along the cutting plane VIII-VIII according to FIG. 7;

FIG. 9 shows a detailed view of the metering roller according to FIGS. 7 and 8 corresponding to the longitudinal section of FIG. 7 in the region of the mounting of two metering wheel segments which are adjacent in the axial direction;

FIG. 10 shows a schematic perspective detailed view of the substantially tubular hollow body serving for mounting the metering wheel segments of the metering roller according to FIGS. 6 to 9, with drives of the metering wheel segments received therein;

Figure 12:
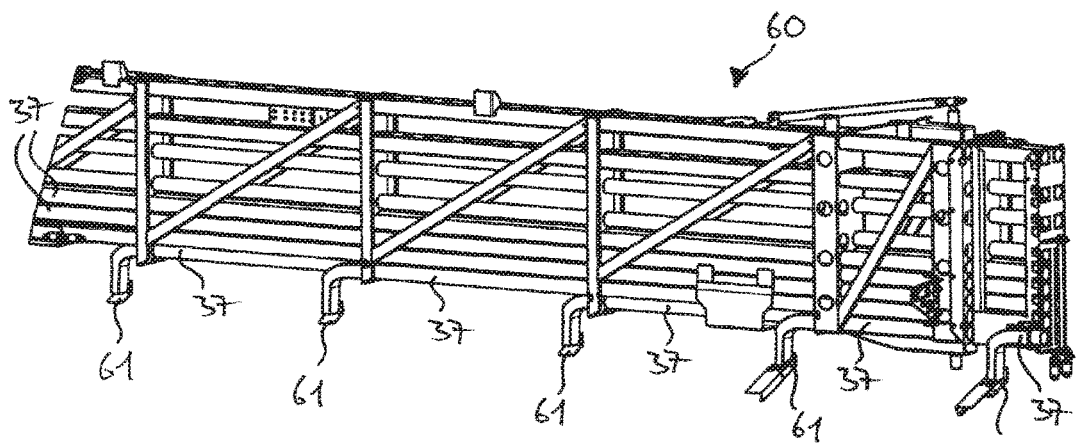
Figure 13:
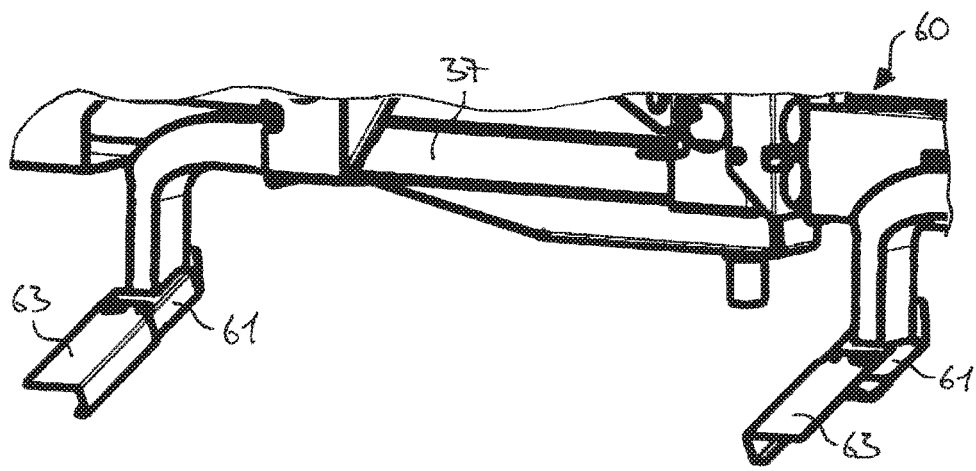
Figure 15:
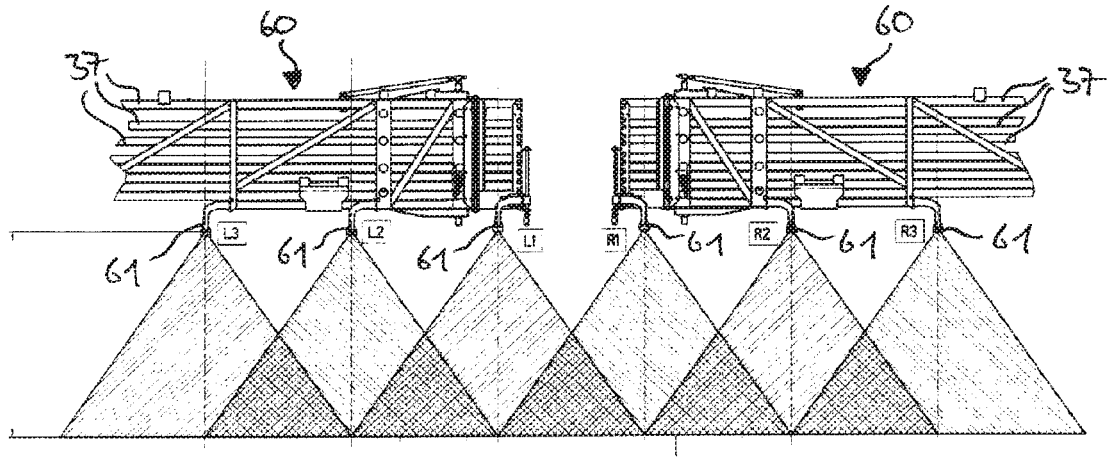
Figure 16:
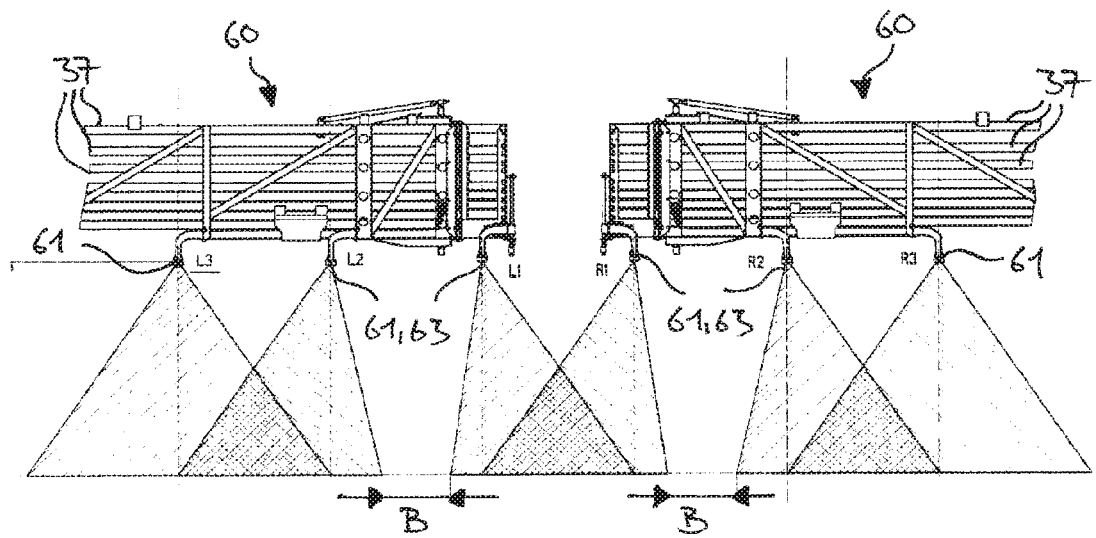

FIG. 12 shows a schematic perspective detailed view of a portion of a boom of the pneumatic distribution machine according to FIGS. 1 to 4 with a plurality of distribution elements in the form of deflector plates and/or deflector disks arranged at a lateral spacing from one another and supplied with partial mass flows of metered material to be distributed by one respective conveying line, wherein two distribution elements have been provided with limiter devices;

FIG. 13 shows a schematic detailed view corresponding to FIG. 12 of the distribution elements provided with the limiter devices;

FIG. 14 shows schematic perspective detailed views of the limiter devices according to FIGS. 12 and 13;

FIG. 15 shows a schematic view of the two inner portions of two booms extending in each case laterally to the direction of travel according to FIGS. 12 and 13 of the pneumatic distribution machine according to FIGS. 1 to 4 for illustrating normal spreading; and FIG. 16 shows a schematic view corresponding to FIG. 15 for illustrating a possible spreading mode according to the invention in which the tramlines of the pneumatic distribution machine are left empty at least in the region of the wheels thereof.

Figure 1:
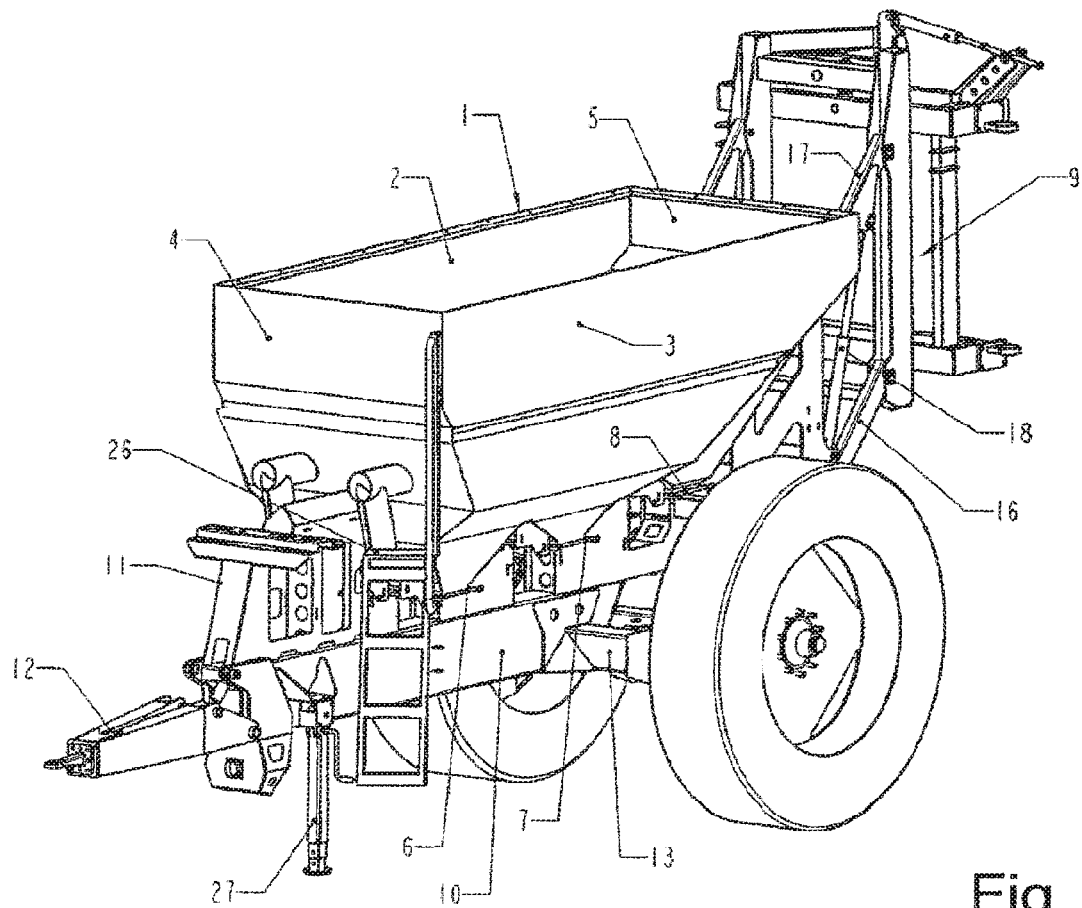
FIG. 1 shows a schematic perspective view of an embodiment of an agricultural machine according to the invention for dispensing material to be distributed in the form of a pneumatic distribution machine designed as a trailer.

In FIG. 1 an exemplary embodiment of a pneumatic distribution machine in the form of a single axle trailer pulled by a traction machine, such as a tractor, is shown by way of example, said pneumatic distribution machine being configured as a pneumatic spreader for powdery or particulate material to be distributed such as fertilizer and/or seed. Relative to the booms, not shown in FIG. 1 for illustrative reasons, which extend transversely to the direction of travel, with the conveying lines leading to the individual distribution elements, reference might be made to the embodiments below with reference to FIG. 12 and thereafter.

The distribution machine has a storage container 1 for receiving the material to be distributed, the lateral 2, 3, front 4 and rear walls 5 tapering in the lower region inwardly toward a bottom recess which has on either side of the longitudinal axis of the storage container 1 outlet openings 6, 7, 8 which in each case are assigned a metering element (see reference numeral 100 of FIG. 4) which is described below with reference to FIGS. 5 to 11 in detail. In the present case, for example, in each case three, i.e. a total of six, outlet openings 6, 7, 8 is provided on each side of the storage container 1, said outlet openings being provided in each case with a metering element 100. The metering elements 100, which are not identifiable in detail in FIG. 1, are for example arranged at variable height and in each case supply a plurality of conveying lines with the metered material to be distributed, wherein the conveying lines in each case are combined into groups and initially guided to the rear to a lifting frame 9 and then deflected outwardly. The lifting frame 9 receives the booms, not shown in FIG. 1, which extend on both sides substantially perpendicular to the direction of travel (see FIGS. 12 and 13). Each boom in this case is expediently pivotably articulated on the lifting frame 9 and designed with multiple joints, so that individual boom portions together with the conveying lines may be folded in from an outwardly extended operating position into a folded up resting and/or transport position. The conveying lines received by the booms terminate with different spacings from the longitudinal axis of the distribution machine on distribution elements which, for example, are designed as deflector plates and/or deflector disks in order to distribute the flow of material to be distributed exiting from the conveying lines into the respectively adjacently arranged surface areas of the soil (see FIGS. 12 to 16).

Figure 2:
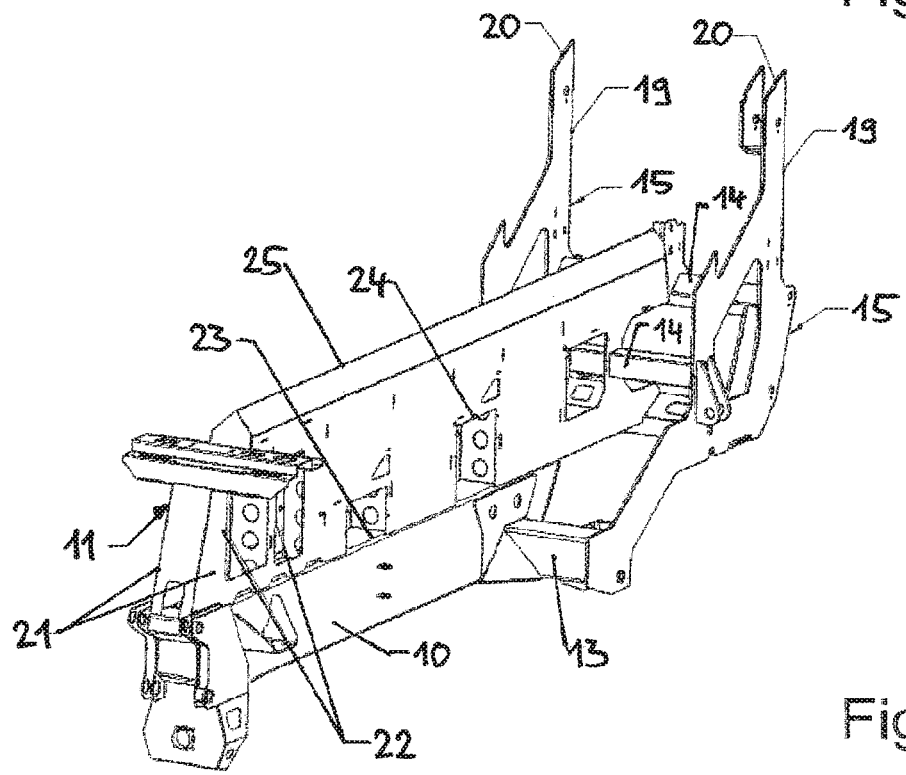
FIG. 2 shows a schematic perspective view of the supporting structure of the pneumatic distribution machine according to FIG. 1.

As may be derived further from FIG. 1 and in particular FIG. 2, the storage container 1 is received by a supporting frame which in the present case has a central strut 10, for example in the form of a rectangular tube, a structure 11 being fixed to the upper face thereof, said structure for example having a tunnel-shaped design. A drawbar 12 is resiliently attached, for example, at the front end of the strut 10, whilst an axle frame 13 is fixed at the rear end. A supporting structure is attached to the rear end of the structure 11, said supporting structure being formed from crossmembers 14 and side cheeks 15 connecting these crossmembers at the ends thereof. Linkages 16, 17 are mounted on the two side cheeks 15, said linkages being articulated on the lifting frame 9 with the other end thereof, and by means of lifting supports 18, for example in the form of hydraulic cylinders, are able to lift and lower the lifting frame 9. By means of their beveled ends 20 the upwardly extending portions 19 of the side cheeks 15 support the inclined rear wall 5 of the storage container 1. The tunnel-shaped construction 11 in the exemplary embodiment shown has on its side walls 21, for example, mounting openings 22, 23 and brackets 24 for arranging functional parts, wherein the brackets 24 receive the metering elements including their drives, which are described in more detail below. The supply lines, such as hydraulic lines and/or electrical lines, may be laid inside the tunnel-shaped structure 11. On its upper face the structure 11 is configured in the manner of a gable 25 which runs to a point at the top and which together with its side walls 21 form a partition in the storage container 1. The gable 25 conducts the material to be distributed which is located in the storage container 1 to outlet openings 6, 7, 8 of the storage container 1 arranged to the right and left thereof, with the metering elements 100 arranged downstream thereof. In addition, for example, an access platform 26 which is accessible via a ladder may be arranged on the structure 25. Moreover, a support foot 27 is pivotably fastened to the strut 10.

Figure 3:
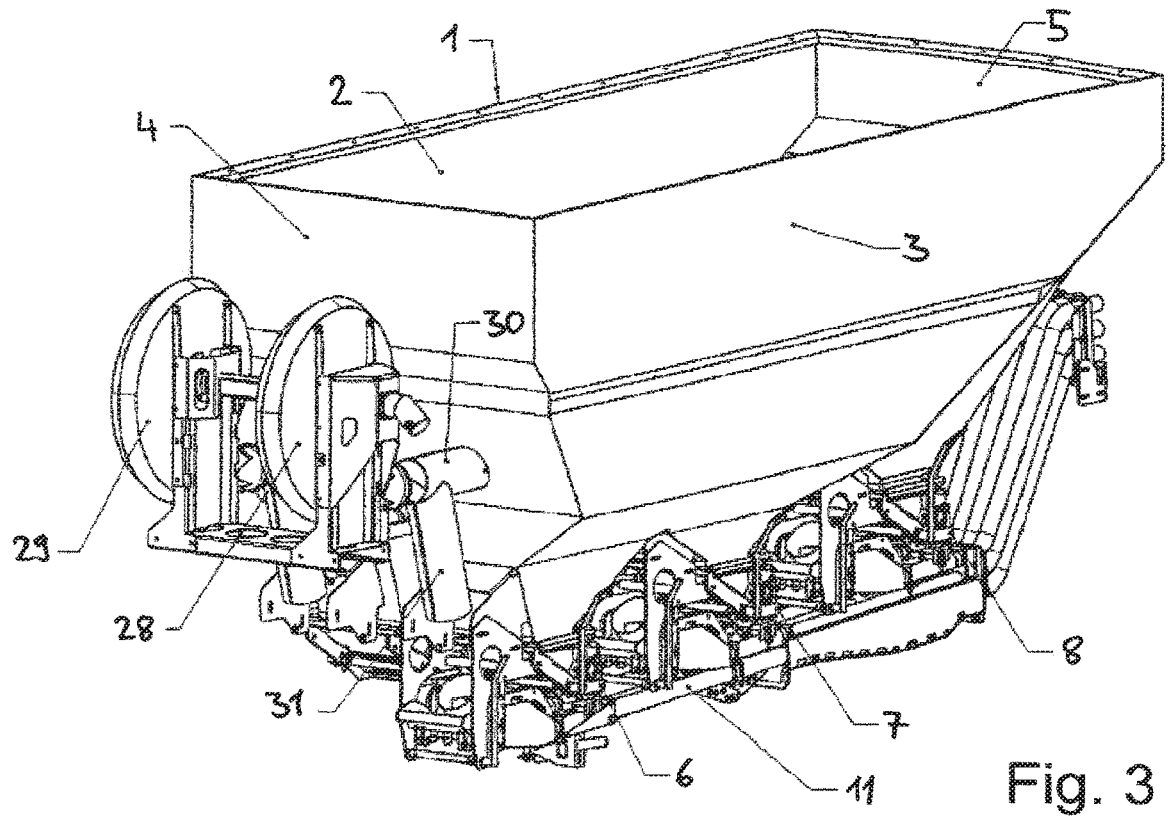
FIG. 3 shows a schematic perspective view of the air guidance of the pneumatic distribution machine according to FIGS. 1 and 2.
Figure 4:
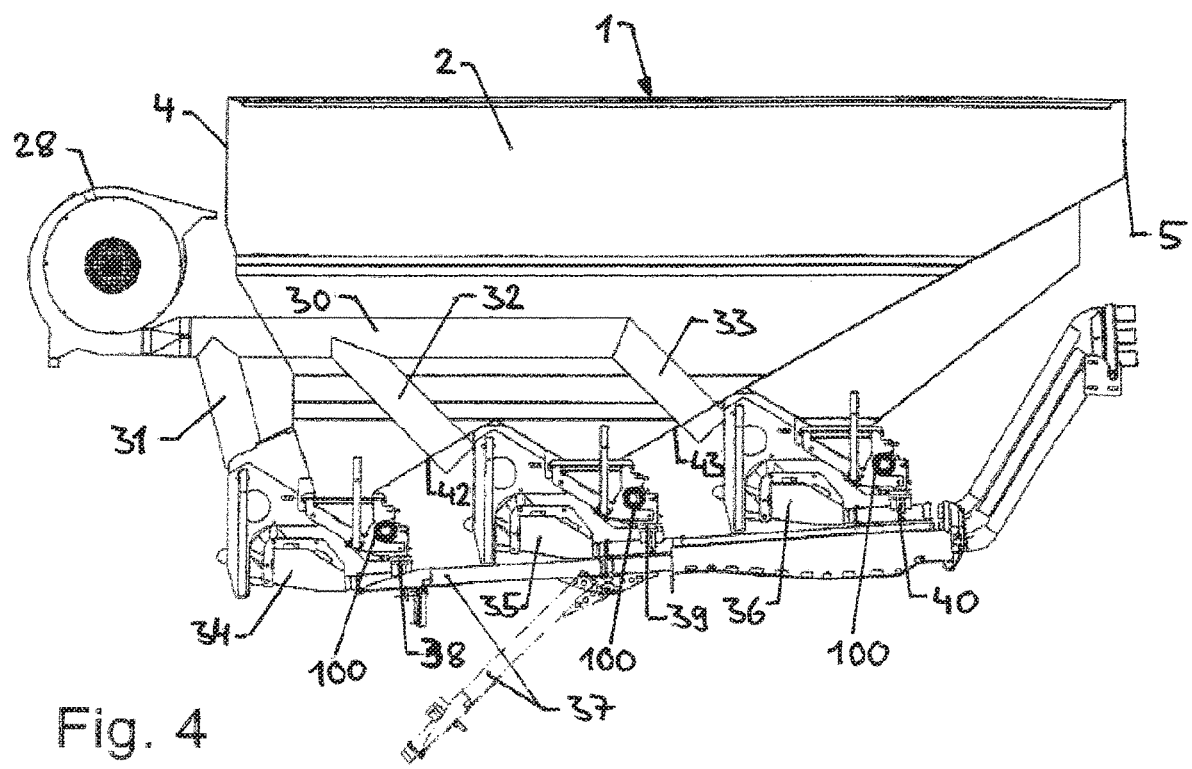
FIG. 4 shows a schematic longitudinal section of the pneumatic distribution machine according to FIGS. 1 to 3.

As is disclosed, in particular, in FIGS. 3 and 4, two fans 28, 29 are arranged upstream of the front wall 4 of the storage container 1, said fans serving for producing a conveyed airflow for the transport of the material to be distributed which is metered by means of the metering elements 100 through the conveying lines and for space reasons, for example, said fans being arranged with their axis transversely to the direction of travel. The pressure line 30 of each fan 28, 29, for example, is guided through the storage container 1 and has one respective outlet 31, 32, 33 which is assigned to each metering element provided as a whole with the reference numeral 100 and which upstream of one respective metering element 100 feeds into one respective air distributor 34, 35, 36, for example by means of pipelines, not shown illustratively. The air distributor subdivides the compressed air by the number of conveying lines 37 assigned to each metering element 100, in FIG. 4 for illustrative reasons only the conveying lines 37 thereof which are located at the front being shown. Immediately downstream of each air distributor 34, 35, 36 a transfer chamber 38, 39, 40 is assigned to each conveying line 37, said transfer chamber being able to be provided in the conventional manner with an injector (not shown) comprising a nozzle and a diffusor and into which the metered material to be distributed is transferred from the respective metering element 100. Whilst the conveying lines 37 acted upon by the fan 28 lead into the left-hand boom in the direction of travel, the conveying lines 37 supplied by the fan 29 lead into the right-hand boom in the direction of travel (see also FIG. 12 and thereafter). The number of conveying lines 37 assigned to each metering element 100 corresponds to the relatively large width of conventional partial width switching during operation. The conveying lines 37 may also be configured as separate portions between the metering elements 100 in order to fold down a portion thereof, for example together with a respective transfer chamber 38, 39, 40 (see the view of FIG. 4 in dashed lines), and in this manner, for example, to perform calibrations or to be able to empty the storage container 1.

Figure 5:
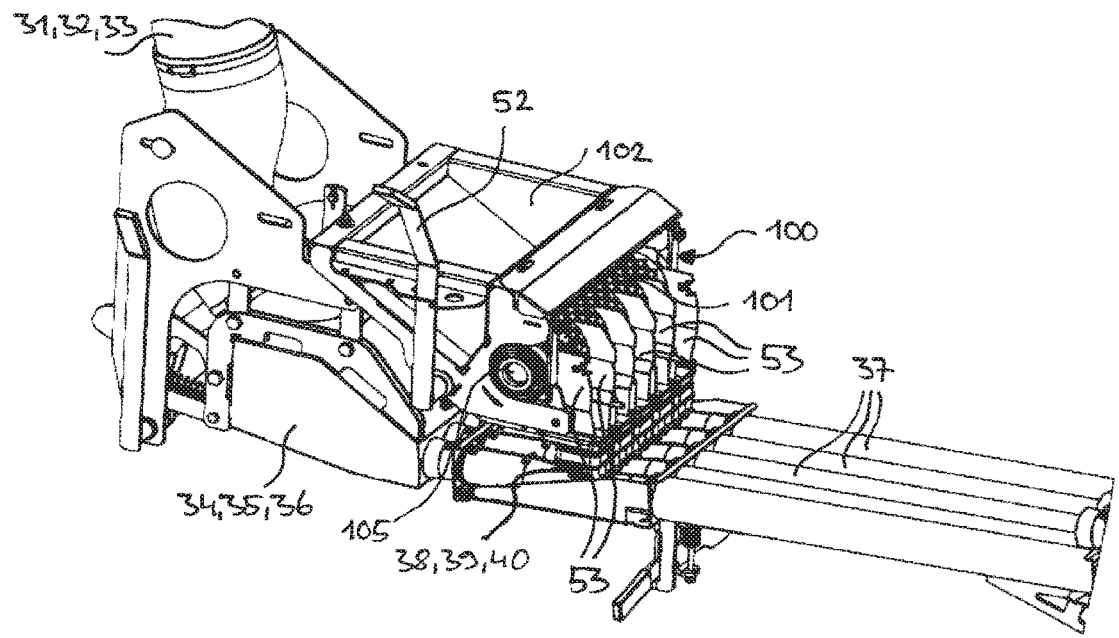
FIG. 5 shows a schematic perspective detailed view of the pneumatic distribution machine according to FIGS. 1 to 4 in the region of one of its metering elements.

FIG. 5 shows a detailed view of the pneumatic distribution machine in the region of one of its metering elements 100 which has a rotatably driven metering roller 101, which in the present case is designed, for example, in the manner of a cam roller but depending on the type of material to be distributed may naturally also be configured in the manner of a cellular wheel roller or in any other known manner. Each metering element 100 in this case supplies a plurality of—in this case five—conveying lines 37 and comprises a metering housing 102 which is arranged below one respective outlet opening 6, 7, 8 of the storage container 1 (see above) and may conduct the material to be distributed onto the surface of the metering roller 101. The metering housing 102 may, for example, be pivotable downwardly by means of a lever 52 in order to make the space below the metering roller 101 accessible and in order to be able to empty the storage container 1.

Figure 6:
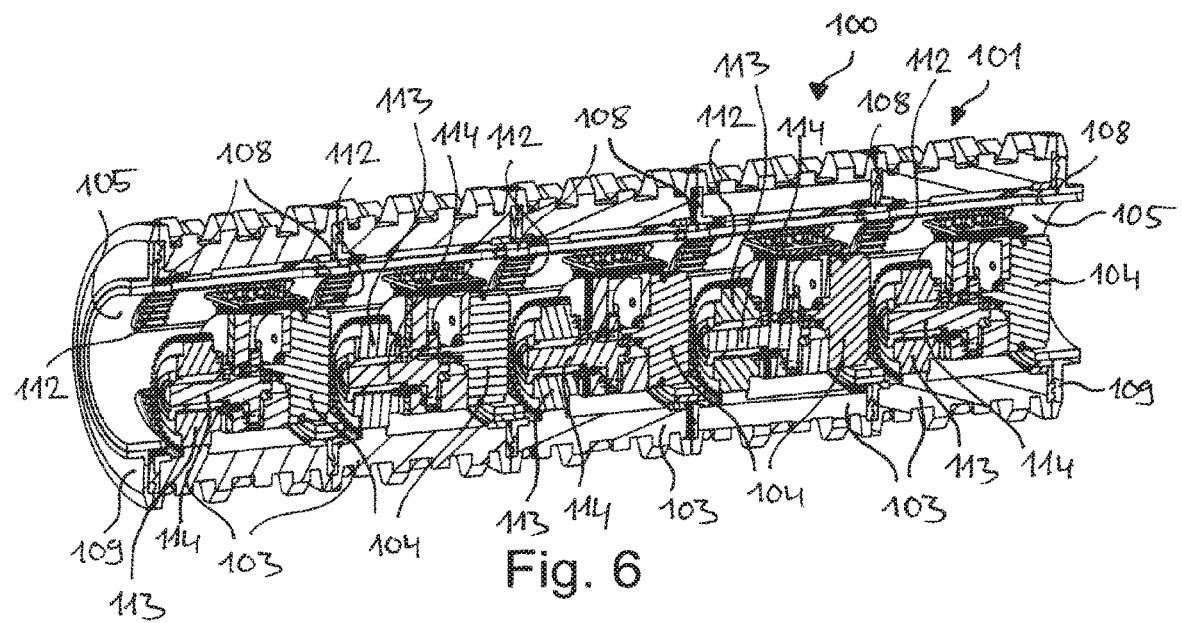
FIG. 6 shows a schematic perspective sectional view of the metering roller of the metering element according to FIG. 5.
Figure 11:
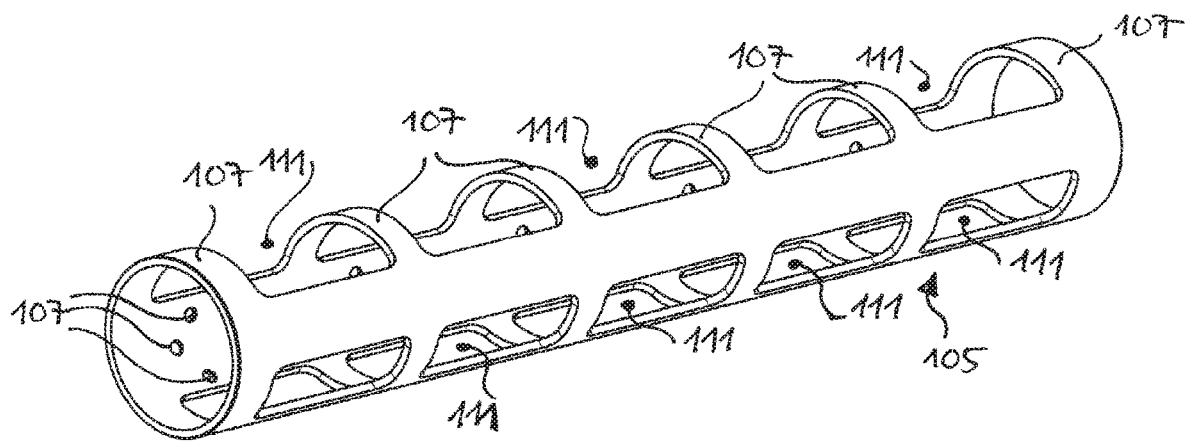
FIG. 11 shows a schematic perspective detailed view of the substantially tubular hollow body according to FIG. 10 without the drives of the metering wheel segments.

As, in particular, may be derived from FIGS. 6 to 8 the metering roller 101 of each metering element 100 comprises a number of metering wheel segments 103—in this case five—which correspond to the number of conveying lines 37, which are supplied by the metering element 100, and which are rotatably driven independently of one another. This is implemented in the exemplary embodiment shown by means of one respective electric motor 104 which is assigned to one respective metering wheel segment 103, said electric motors being able to be controlled and/or regulated in terms of rotational speed independently of one another, in order to bring to a standstill individual metering wheel segments 103 of the metering roller 101 and also in order to be able to drive the metering wheel segments 103 at different rotational speeds. The electric motors 104 serving for driving the metering wheel segments 103 are in the present case configured from one respective brushless DC motor designed as a gear motor but, in principle, may naturally also be used as a different type of electric motor or as a hydraulic motor. As, in particular, is revealed from the detailed view of FIG. 9 and FIG. 10 the metering wheel segments 103 of the metering roller 101 are mounted on a substantially tubular hollow body 105 which extends coaxially to the rotational axis thereof and which is fixed rigidly but preferably releasably in the metering housing 102 and as is shown again as such in FIG. 11. The drives 104 of the metering wheel segments 104—in this case electrical—are accommodated within the substantially tubular hollow body 105 with protection from external influences and, for example, screwed to fastening flanges 106 inside the hollow body 105 (see FIGS. 8 and 10). The fastening flanges 106 in this case, for example, may be welded to the internal circumference of the hollow body 105 or screwed thereto (see the fastening bores 107 of FIG. 11).

The substantially tubular hollow body 105 has overall an approximately circular cylindrical shape and in the present case comprises a plurality of portions 107 which are spaced apart in the axial direction and which extend over the entire circumference thereof and serve for receiving bearings 108 positioned on the outer circumference thereof, by means of which each metering wheel segment 104 is mounted at its two axial ends and adjacently to one another in the axial direction. The portions 107 over the entire circumference are in this case, on the one hand, provided at the two ends of the substantially tubular hollow body 105 and, on the other hand, at equidistant spacings in the axial direction thereof, wherein the axial spacing of the portions 107 over the entire circumference is adapted to the axial length of each metering wheel segment 103. In FIG. 9 it may be identified that in the present case for the purpose of achieving a very small constructional space the bearings 108 are configured as plain bearings and, on the one hand, have an internal bearing shell 108a which sits on the outer circumference of one respective portion 107 on the entire circumference of the substantially tubular hollow body 105 and, on the other hand, an outer bearing shell 108b on which the axial ends of the metering wheel segments 103 are located. In the case of two metering wheel segments 103 adjacent to one another, the bearings 108 are configured as twin bearings and have two rotatable outer bearing shells 108b which are independent from one another relative to the inner bearing shell 108a, which in each case receives the end of one of the adjacent metering wheel segments 103. Alternatively naturally separate bearings may also be provided for each metering wheel segment 103 (not shown). The metering wheel segments 103 are able to be pushed in this manner from one end of the hollow body 105 provided with the bearings 108 in the axial direction onto the hollow body 105, wherein in each case a retaining ring 109 serving as an abutment for the metering wheel segments 103 may be provided at the ends of the substantially tubular hollow body 105 (see FIGS. 6 and 7), at least one thereof being releasably fastenable to the outer circumference of the hollow body 105 in order to mount the metering wheel segments 103 on the hollow body 105 in a manner which is axially fixed but so that said metering wheel segments are rotatable independently of one another and interchangeable. It may also be identified in FIG. 9 that the metering wheel segments 103 which are mounted in the axial direction so as to be tightly packed on the substantially tubular hollow body 105 are sealed relative to one another with slip-ring seals 110—in this case in the form of labyrinth seals—on their front faces which face one another, in order to prevent a penetration of material to be distributed and also dirt and moisture into the interior of the hollow body 105 receiving the drives 104.

The substantially tubular hollow body 105 has in each case between its portions 107 over the entire circumference one or more through-openings 111 which in the mounted state of the metering wheel segments 103 are respectively encompassed thereby. The through-openings 111 of the hollow body 105 serve for connecting one respective drive 104 to one respective metering wheel segment 103 which for this purpose has an internal toothing 112 extending around an internal circumferential portion (see FIGS. 6 to 8) which is exposed by one respective through-opening 111 of the hollow body 105. The internal toothing 112 of one respective metering wheel segment is in engagement with one respective gearwheel 113 which is located on one respective output shaft 114 of one respective drive 104 expediently arranged eccentrically relative to the rotational axis of the metering wheel segments 103 (see in particular FIGS. 7 and 8). As is revealed most clearly from FIG. 10, each drive 104 which is formed from one respective electric gear motor is also accommodated so as to be encapsulated in a housing in order to protect it in the best possible manner from mechanical influences and also from dirt and moisture.

Moreover, a position detection sensor, not shown in the drawings, such as a rotational speed sensor or the like, is preferably assigned to each metering wheel segment 103, said sensor for example being able to be integrated in one respective motor of the drives 104 or in the gears thereof. Both the sensors and the drives 104 are operatively connected to individual or common control modules of a similarly not illustrated control and/or regulating device of the distribution machine in order to be able to control and/or regulate the rotational speed of the individual metering wheel segments 103 of the metering elements 100 independently of one another and at the same time to ensure a very accurate distribution of the material to be distributed on the field according to application cards, wherein the position of the distribution machine on the field may be determined in real time by means of known position detection systems, such as GPS or the like. Moreover, local undersupplies and/or oversupplies of the soil with the material to be distributed due to cornering or when switching on or switching off the metering elements 100 at the start and at the end of the distribution operation and/or in the case of one respective journey from the headland along a field tramline to the opposing headland in the manner described above, may be compensated with a very high degree of accuracy.

In order to ensure that one respective metering wheel segment 103 of the metering roller 101 of each metering element 100 exclusively supplies the distribution element assigned thereto and that, for example, the already metered mass flows of material to be distributed from adjacent metering wheel segments 103 are not partially mixed and/or do not enter the transfer chamber 38, 39, 40 of an adjacent conveying line 37, it also proves advantageous if the metering roller 101 is assigned a plurality of guide plates 53 (see FIG. 5) which are arranged at a spacing from one another corresponding to the axial length of one respective metering wheel segment 103 of the metering roller 101 and which extend from the outer circumference of the metering roller 101 between in each case two adjacent metering wheel segments 103 downwardly as far as the upper inlet of each transfer chamber 34, 35, 36. In FIG. 5 it may also be identified that the substantially tubular hollow body 105, preferably on at least one of its ends, penetrates the metering housing 102 toward the outside in order to provide electrical contact for the drives 104 accommodated in its interior from its axial direction, with the supply lines also being laid in the interior of the hollow body 105.

In FIG. 12 a detail of a boom provided as a whole with the reference numeral 60—here of the left-hand boom 60 viewed in the direction of travel—of the pneumatic distribution machine is shown schematically, said boom being pivotably fastened to the lifting frame 9 thereof (see FIG. 1). As already mentioned, each boom 60 receives a plurality of conveying lines 37 of the material to be distributed adjoining one respective transfer chamber 38, 39, 40—generally half of all of the conveying lines 37—wherein the conveying lines 37 terminate a different spacings from the longitudinal axis of the distribution machine at distribution elements which in the present case are designed as deflector plates 61 and/or deflector disks in order to distribute the flow of material to be distributed exiting from one respective conveying line 37 and metered by one respective metering wheel segment 103 of the metering elements 100 into respectively adjacently arranged surface areas of the soil.

As may be derived in particular from the detailed view of FIG. 13, shown broken away, in this case the adjacent deflector plate(s) 61, from which the material to be distributed partially passes into the tracks of the trailer and/or the tractor pulling said trailer, may be provided with limiter devices 63 in order to prevent the material to be distributed (also) being distributed along the tracks and in this manner to ensure that the material to be distributed is economized. The adjustment of a reduced mass flow of material to be distributed according to the tire width, the deflector plates 61 provided with the limiter devices 63 being supplied with said material to be distributed, is possible in a simple manner by means of the metering elements 100 according to the invention, due to the finely subdivided partial widths corresponding to the number of distributer elements in the form of deflector plates 61, by the metering wheel segment 103 which is assigned to the respective deflector plate 61 via the associated conveying line 37 being driven at a rotational speed which is lower relative to the other metering wheel segments 103.

Figures 14A, 14B:
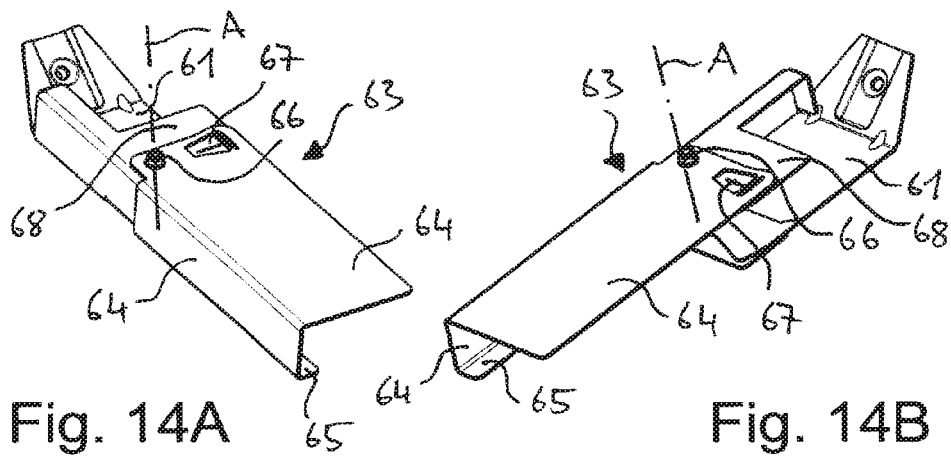

In FIGS. 14A and 14B schematic views of an embodiment of such a limiter device 63 which is releasably fastened to a deflector plate 61 or configured together with the deflector plate 61 are shown schematically, said limiter devices differing from known spread limiter devices in the form of guide plates, as are occasionally used in pneumatic distribution machines for externally limiting the working width, on the one hand, by the limiter device 63 having a substantially U-shaped profile, the U-shaped projection 64 thereof extending in the state mounted on the deflector plate 61 approximately perpendicular to the plane of the deflector plate 61. In each case approximately at a right angle, on the one hand, adjoining the U-shaped projection 64 of the limiter device 63 is a long U-shaped limb 64 on the upper face and, on the other hand, a short U-shaped limb 65 on the lower face, wherein the U-shaped limbs 64, 65 in the mounted state are arranged in planes approximately parallel to the plane of the deflector plate 61. In this manner, it is reliably prevented that the particles of material to be distributed which are deflected off the limiter device 63 are reflected into the partial widths of adjacent distribution elements.

On the other hand, the limiter devices 63 differ from conventional spread limiter devices which may be mounted on the outer deflector plate for limiting the working width, in particular by being adjustably mounted on the deflector plate 61 or —in the case of designing the limiter device 63 together with the deflector plate 61—by being able to be adjusted relative to the deflector plate 61 in order to be able to take into account different distribution parameters such as, in particular, the width and the position of the tracks predetermined by the tires but, for example, also the attachment height of the booms 60 and/or the spacing of the distribution elements 61 from the soil, the type of material to be distributed including the flight characteristics thereof, the lateral spacing of the distribution elements 61 from one another, etc. The adjustability of the limiter devices 63 in the present exemplary embodiment is provided by said limiter devices being pivotable relative to the deflector plate 61 about an axis A extending approximately perpendicular to the two U-shaped limbs 64, 65 and/or perpendicular to the plane of the deflector plate 61 which, for example, may be implemented by means of a screw 66 or the like passing through corresponding bores, on the one hand, of the deflector plate 61 and, on the other hand, of the limiter device 63. A scale 67 may be used for the display of the respectively set adjustment angle, said scale in the exemplary embodiment shown being arranged on a supporting portion 68 of the long U-shaped limb 64 of the limiter device 63 fixedly connected to the deflector plate 61 and being partially visible through a through-opening of the terminal portion of the long U-shaped limb 64 which encompasses the supporting portion 68 and which is pivotably articulated thereto about the axis A.

Moreover, according to a development of the limiter device 63 it may be provided that it is able to be adjusted not only manually but by motor and in particular remotely operated, such as for example by means of a motor, actuator or the like driven in a controlled manner (not shown in the drawings). In this case, for example, the control and/or regulating device of the distribution machine may be configured for the input of a desired adjustment angle of the limiter device 63 and/or for the input of the aforementioned parameters, wherein the control and/or regulating device in the last-mentioned case may calculate the suitable adjustment angle of the limiter device 63 according to the input parameters.

Whilst in FIG. 15 the situation of normal spreading is shown in which all distribution elements 61 are supplied with the respectively desired mass flow of material to be distributed by means of one respective metering wheel segment 103 of the metering rollers 101 of the metering elements 100 and the spreading cones respectively reflected by the deflector plates 61 overlap one another, in order to ensure an even transverse distribution, in FIG. 16 the situation is shown resulting from when the tramlines of the pneumatic distribution machine are left empty at least by the width B of its wheels and/or tires in the above-described manner, by the deflector plate 61 adjacent to the respective tramline, on the one hand, being provided with a correspondingly aligned limiter device 63 (see in particular FIGS. 14A and 14B) and, on the other hand, by the respective metering wheel segment 103 of the metering roller 101 of the respective metering element 100 assigned thereto being supplied with a correspondingly lower mass flow of material to be distributed. The spreading cones of the deflector plates 61 provided with the limiter devices 63 in this manner no longer extend into the wheel tracks B, wherein due to the reduced mass flow of material to be distributed with which the deflector plates 61 provided with the limiter devices 63 are supplied via the conveying lines 37, an oversupply of the soil with material to be distributed does not occur on either side of the tracks B.

The invention claimed is:

1. An agricultural machine for dispensing material to be distributed, the agricultural machine comprising at least one metering element having a metering roller for metering the material to be distributed, which metering roller is mounted in a metering housing and is rotatably driven, wherein the metering roller of the metering element has a plurality of metering wheel segments which are mounted on a hollow body extending coaxially to the rotational axis thereof and each metering wheel segment of the metering roller is assigned a separate drive in order to drive the metering wheel segments independently of each other, wherein the drives of the metering wheel segments of the metering roller are arranged in the interior of the metering wheel segments, wherein the drives of the metering wheel segments of the metering roller are fixed in the interior of the hollow body bearing the metering wheel segments and in each case have a gearwheel which is assigned to one respective metering wheel segment, the outer surface of the hollow body has a through-opening at least on an axial portion thereof assigned to one respective gearwheel and one respective gearwheel is in engagement with one respective internal toothing of one respective metering wheel segment.

2. The agricultural machine as claimed in claim 1, wherein the drives of the metering roller of the metering element comprise electric or hydraulic motors.

3. The agricultural machine as claimed in claim 1, wherein the metering roller of the metering element has at least three metering wheel segments driven independently of one another.

4. The agricultural machine as claimed in claim 1, wherein the metering wheel segments of the metering roller are mounted by plain and/or rolling bearings on the hollow body which extends coaxially to the rotational axis thereof.

5. The agricultural machine as claimed in claim 1, wherein the metering wheel segments of the metering roller are sealed relative to one another on front faces thereof which face one another by slip-ring seals.

6. The agricultural machine as claimed in claim 1, wherein the metering wheel segments of the metering roller are replaceably mounted on the hollow body, wherein the metering wheel segments
    may be pushed onto the hollow body in the axial direction; and/or
    are of multi-part configuration in the form of substantially circular-arc-shaped metering wheel segment portions which may be releasably fastened to one another.

7. The agricultural machine as claimed in claim 1, wherein the drives of the metering wheel segments of the metering roller are accommodated in a housing and/or are flooded with an inert liquid.

8. The agricultural machine as claimed in claim 1, wherein a position detection sensor is assigned to each metering wheel segment of the metering roller.

9. The agricultural machine as claimed in claim 1, wherein a separate control module is assigned to
    one respective drive of one respective metering wheel segment and/or
    groups of drives of a plurality of metering wheel segments,
    said control module being connected to a control and/or regulating device of the agricultural machine.

10. The agricultural machine as claimed in claim 1, wherein a plurality of guide plates is assigned to the metering roller, said guide plates being arranged spaced apart from one another corresponding to the axial length of one respective metering wheel segment and in each case extending between two adjacent metering wheel segments directly onto the outer surface of the metering roller.

11. The agricultural machine as claimed in claim 1, wherein the metering element comprises two rotatably driven metering rollers which are mounted in one or in one respective metering housing for metering different materials to be distributed, wherein the metering rollers of the metering element in each case have a plurality of metering wheel segments which are rotatably driven independently of one another, wherein the materials to be distributed which are metered by one respective metering wheel segment of both metering rollers in each case may be dispensed together.

12. The agricultural machine as claimed in claim 1, wherein a distribution element, from the group including:
    deposit openings for depositing the material to be distributed on the surface of the soil;
    deflector plates for the transverse distribution of the material to be distributed over a partial width of the entire working width;
    injection devices for introducing the material to be distributed into the soil; and
    seed coulters or seeding tines,
    is assigned to one respective metering wheel segment of the metering roller of the metering element.

13. The agricultural machine as claimed in claim 1, wherein the agricultural machine is pneumatic and has a plurality of transfer chambers which are arranged downstream of one respective metering wheel segment of the metering roller of the metering element and which, on the one hand, are connected to at least one fan and which, on the other hand, feed into one respective conveying line in order to transfer the material to be distributed, which is metered by one respective metering wheel segment of the metering roller, pneumatically to distribution elements which are arranged at a variable lateral spacing from the longitudinal axis of the agricultural machine.

14. A metering element comprising a rotatably driven metering roller which is mounted in a metering housing and which is suitable for use in an agricultural machine for dispensing material to be distributed, wherein the metering roller has a plurality of metering wheel segments which are mounted on a hollow body extending coaxially to the rotational axis thereof and each metering wheel segment of the metering roller is assigned a separate drive in order to drive the metering wheel segments independently of each other, wherein the drives of the metering wheel segments of the metering roller are arranged in the interior of the metering wheel segments, wherein the drives of the metering wheel segments of the metering roller are fixed in the interior of the hollow body bearing the metering wheel segments and in each case have a gearwheel which is assigned to one respective metering wheel segment, the outer surface of the hollow body has a through-opening at least on an axial portion thereof which is assigned to one respective gearwheel and one respective gearwheel is in engagement with one respective internal toothing of one respective metering wheel segment.

15. The metering element as claimed in claim 14, wherein the drives of the metering roller of the metering element comprise electric or hydraulic motors.

16. The metering element as claimed in claim 14, wherein the metering roller of the metering element has at least three metering wheel segments driven independently of one another.

17. The metering element as claimed in claim 14, wherein the metering wheel segments of the metering roller are mounted by plain and/or rolling bearings on a hollow body which extends coaxially to the rotational axis thereof.

18. The metering element as claimed in claim 14, wherein the metering wheel segments of the metering roller are sealed relative to one another on front faces thereof which face one another by slip-ring seals.

19. The metering element as claimed in claim 14, wherein the metering wheel segments of the metering roller are replaceably mounted on the hollow body wherein the metering wheel segments may be pushed onto the hollow body in the axial direction; and/or are of multi-part configuration in the form of substantially circular-arc-shaped metering wheel segment portions which may be releasably fastened to one another.

20. The metering element as claimed in claim 14, wherein the drives of the metering wheel segments of the metering roller are accommodated in a housing and/or are flooded with an inert liquid.

21. The metering element as claimed in claim 14, wherein a position detection sensor is assigned to each metering wheel segment of the metering roller.

22. The metering element as claimed in claim 14, wherein a separate control module is assigned to one respective drive of one respective metering wheel segment and/or groups of drives of a plurality of metering wheel segments, said control module being connected to a control and/or regulating device of the metering element.

23. The metering element as claimed in claim 14, wherein a plurality of guide plates is assigned to the metering roller, said guide plates being arranged spaced apart from one another corresponding to the axial length of one respective metering wheel segment and in each case extending between two adjacent metering wheel segments directly onto the outer surface of the metering roller.

24. The metering element as claimed in claim 14, wherein the metering element comprises two rotatably driven metering rollers which are mounted in one or in one respective metering housing for metering different materials to be distributed, wherein the metering rollers of the metering element in each case have a plurality of metering wheel segments which are rotatably driven independently of one another, wherein the materials to be distributed which are metered by one respective metering wheel segment of both metering rollers in each case may be dispensed together.

* * * * *